US012748039B2

(12) United States Patent
Kang et al.

(10) Patent No.: US 12,748,039 B2
(45) Date of Patent: Sep. 29, 2026

(54) OPTICAL MEASUREMENT APPARATUS AND OPTICAL MEASUREMENT METHOD

(71) Applicant: SAMSUNG ELECTRONICS CO., LTD., Suwon-si (KR)

(72) Inventors: Jooyoun Kang, Suwon-si (KR); Gideok Kim, Suwon-si (KR); Kwangsoo Kim, Suwon-si (KR); Wookrae Kim, Suwon-si (KR); Jaeseok Son, Suwon-si (KR); Eunjoo Lee, Suwon-si (KR); Soonhong Charles Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/754,702

(22) Filed: Jun. 26, 2024

(65) Prior Publication Data

US 2025/0052667 A1 Feb. 13, 2025

(30) Foreign Application Priority Data

Aug. 10, 2023 (KR) ........................ 10-2023-0104627

(51) Int. Cl.
*G01N 21/21* (2006.01)
*G01N 21/95* (2006.01)
*G01N 21/956* (2006.01)

(52) U.S. Cl.
CPC ....... *G01N 21/211* (2013.01); *G01N 21/9501* (2013.01); *G01N 21/956* (2013.01); *G01N 2021/213* (2013.01)

(58) Field of Classification Search
CPC ............. G01N 21/211; G01N 21/9501; G01N 21/956; G01N 2021/213; G01N 21/171;
(Continued)

(56) References Cited

U.S. PATENT DOCUMENTS 6,268,916 B1 7/2001 Lee et al.
6,408,048 B2 6/2002 Opsal et al.
(Continued)

FOREIGN PATENT DOCUMENTS

CN 101995224 A 3/2011

OTHER PUBLICATIONS

Lim et al., "Cytoplasmic Protein Imaging with Mid-Infrared Photothermal Microscopy Cellular Dynamics of Live Neurons and Oligodendrocytes", J. Phys. Chem. Lett., 2019, vol. 10, pp. 2857-2861 (5 pages total).
(Continued)

*Primary Examiner* — Md M Rahman
(74) *Attorney, Agent, or Firm* — Sughrue Mion, PLLC

(57) ABSTRACT

An optical measurement apparatus includes a first light emitter configured to emit a first light on a surface of a sample, a second light emitter configured to emit a second light on the surface of the sample on which the first light is focused, a physical property detector configured to obtain physical property information of the sample by detecting a change in an amount of light of the second light due to a photothermal effect of the first light on the surface of the sample, and at least one structure detector configured to obtain structural information of the sample by detecting a reflected light of at least one of the first light and the second light that is reflected from the surface of the sample.

16 Claims, 11 Drawing Sheets

(58) Field of Classification Search
CPC ............... G01N 21/01; G01N 21/3563; G01N 2021/3568; G01N 21/3151; G01N 21/45; G01N 2021/3155; H10P 72/06
USPC .......................................................... 356/369
See application file for complete search history.

(56) References Cited

U.S. PATENT DOCUMENTS 6,483,580 B1 * 11/2002 Xu ...................... G03F 7/70625 257/E21.53
6,882,421 B2 4/2005 Opsal et al.
6,917,039 B2 7/2005 Nicolaides et al.
6,963,401 B2 11/2005 Opsal et al.
7,009,695 B2 3/2006 Some
7,106,425 B1 * 9/2006 Bultman ............ G01N 21/9501 356/73
7,705,977 B2 4/2010 Salnik et al.
7,755,752 B1 7/2010 Salnik et al.
8,027,996 B2 * 9/2011 Barsness ............. G06F 16/2379 711/108
9,841,324 B2 12/2017 Furstenberg et al.
10,942,116 B2 3/2021 Prater et al.
2002/0093648 A1 * 7/2002 Nikoonahad ....... G03F 7/70708 356/73
2002/0107650 A1 * 8/2002 Wack .................. G03F 7/70708 702/81
2002/0182760 A1 * 12/2002 Wack .................. G03F 7/70708 356/600
2003/0147086 A1 * 8/2003 Rosencwaig .......... G01B 11/24 356/601
2011/0007323 A1 1/2011 De Groot et al.
2019/0286787 A1 * 9/2019 Chouaib ................ B82Y 30/00
2020/0182777 A1 * 6/2020 Park ..................... G01N 21/274
2021/0003504 A1 1/2021 Li et al.
2021/0033382 A1 2/2021 Wang et al.
2023/0063843 A1 * 3/2023 Prater ..................... G01J 3/108
2024/0060880 A1 * 2/2024 Watanabe .............. G01N 21/35

OTHER PUBLICATIONS

Bai et al., "Bond-selective imaging by optically sensing the mid-infrared photothermal effect", Science Advances, 2021, vol. 7, pp. 1-14 (15 pages total).
Communication dated Jan. 5, 2025, issued by the Taiwan Patent Office in Taiwanese Application No. 113121935.
Rapp et al., "Ultrafast pump-probe ellipsometry setup for the measurement of transient optical properties during laser ablation", Optics Express, 2016, vol. 24, No. 16, pp. 17572-17592 (21 pages total).

* cited by examiner

13

OPTICAL MEASUREMENT APPARATUS AND OPTICAL MEASUREMENT METHOD

CROSS-REFERENCE TO RELATED APPLICATION

This application is based on claims priority under 35 U.S.C. § 119 to Korean Patent Application No. 10-2023-0104627, filed on Aug. 10, 2023, in the Korean Intellectual Property Office, the disclosure of which is incorporated herein by reference in its entirety.

BACKGROUND

Example embodiments of the disclosure relate to an optical measurement apparatus and an optical measurement method.

In semiconductor manufacturing, it may be necessary to obtain information concerning properties of a semiconductor material in a sample (such as a wafer) during or after processing. Measurement equipment using Fourier Transform Infrared (FT-IR) spectroscopy may non-destructively inspect a chemical composition of a sample such as a wafer. This FT-IR measurement equipment may inspect a molecular composition in the sample by checking the spectrum to see what wavelength of light is absorbed in the infrared rays transmitted through the sample. However, since the FT-IR measurement equipment uses an infrared light source, the spatial resolution may be relatively low, making it difficult to measure defects that occur in microscopic areas of the patterned wafer.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide an optical measurement apparatus capable chemical composition information and structural information of a sample using photothermal spectroscopy, and an optical measurement method using the optical measurement apparatus.

Additional aspects will be set forth in part in the description which follows and, in part, will be apparent from the description, or may be learned by practice of the presented embodiments.

According to an aspect of an example embodiment, an optical measurement apparatus may include a first light emitter configured to emit a first light on a surface of a sample, a second light emitter configured to emit a second light on the surface of the sample on which the first light is focused, a physical property detector configured to obtain physical property information of the sample by detecting a change in an amount of light of the second light due to a photothermal effect of the first light on the surface of the sample, and at least one structure detector configured to obtain structural information of the sample by detecting a reflected light of at least one of the first light and the second light that is reflected from the surface of the sample.

According to an aspect of an example embodiment, an optical measurement apparatus may include a stage configured to support a sample, a first light source configured to generate a first light having a first wavelength, the first light including pulsed light, a second light source configured to generate a second light having a second wavelength shorter than the first wavelength, an illumination optical system configured to emit the first light and the second light on a surface of the sample, a light receiving optical system configured to receive first reflected light of the first light that is reflected from the surface of the sample and second reflected light of the second light that is reflected from the surface of the sample, a physical property detector configured to obtain physical property information of the sample by detecting a change in an amount of light of the second light due to a photothermal effect of the first light on the surface of the sample, and at least one structure detector configured to obtain structural information of the sample by detecting at least one of the first reflected light and the second reflected light received by the light receiving optical system.

According to an aspect of an example embodiment, an optical measurement method may include emitting a first light on a surface of a sample, emitting a second light on the surface of the sample on which the first light is focused, obtaining physical property information of the sample by detecting a change in an amount of light of the second light due to a photothermal effect of the first light on the surface of the sample, and obtaining structural information of the sample by detecting a reflected light of at least one of the first light and the second light that is reflected from the surface of the sample.

BRIEF DESCRIPTION OF DRAWINGS

The above and other aspects, features, and advantages of certain some example embodiments of the present disclosure will be more apparent from the following description taken in conjunction with the accompanying drawings, in which.

DETAILED DESCRIPTION

Figure 1:
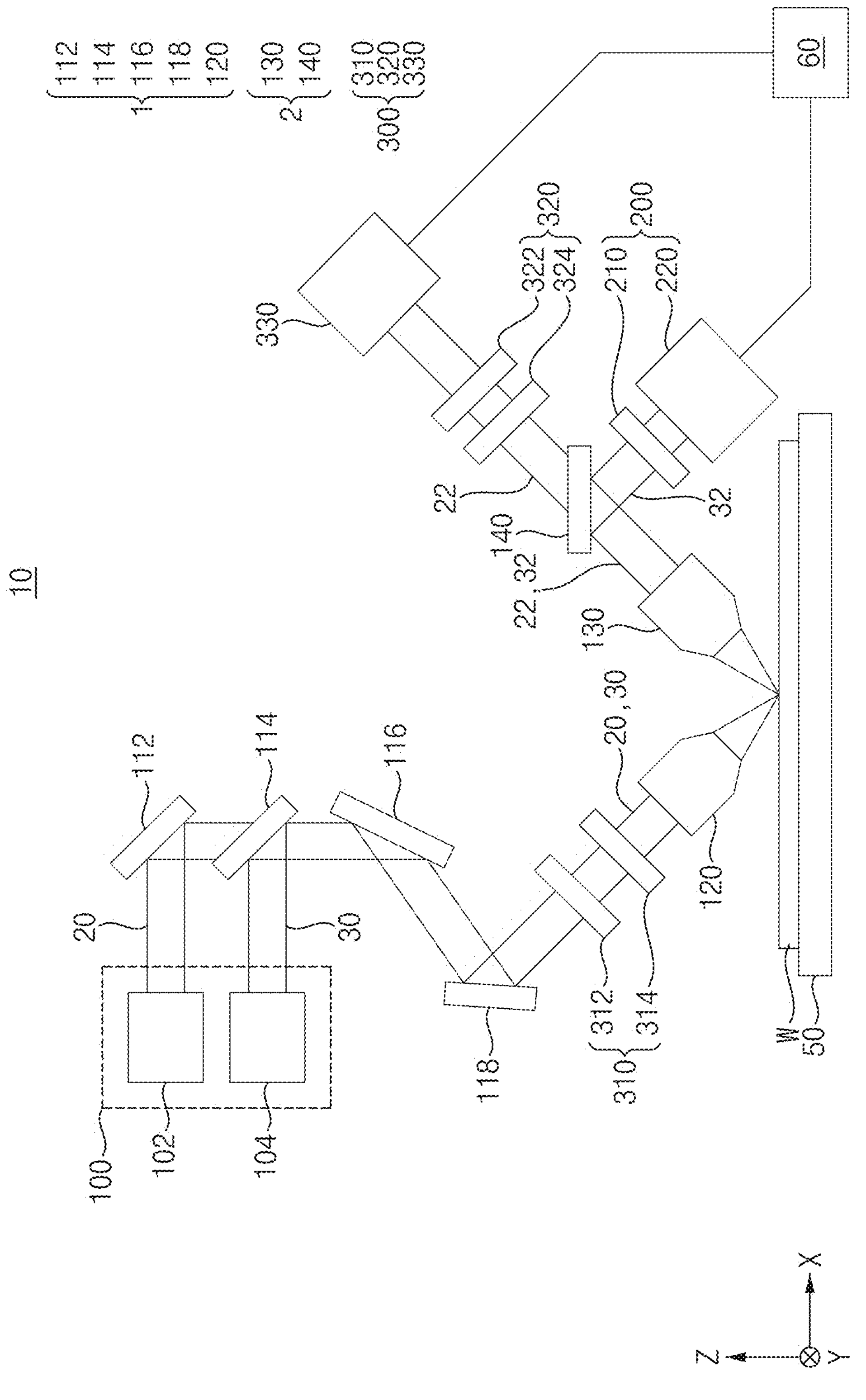
FIG. 1 is a block diagram illustrating an optical measurement apparatus according to one or more example embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

FIG. 1 is a block diagram illustrating an optical measurement apparatus according to one or more example embodiments.

Referring to FIG. 1, an optical measurement apparatus 10 may include a first light emitter 102 configured to emit a first light 20 on a surface of a sample such as a wafer W, a second light emitter 104 configured to emit a second light 30 on the wafer W surface, a physical property detector 200 configured to detect a change in an amount of light of the second light 30 on the wafer W surface to obtain physical property information of the wafer W, and at least one structure detector 300 configured to detect at least one reflected light 22, 32 among the first light 20 and the second light 30 from the wafer W surface to obtain structural information of the wafer W. In addition, the optical measurement apparatus 10 may further include a stage 50 configured to support the wafer W, a controller configured to control operations of the first light emitter 102, the second light emitter 104, the physical property detector 200 and the at least one structure detector 300, and a processor 60 configured to process the detected signals.

In some example embodiments, the optical measurement apparatus 10 may be a photothermal imaging spectroscope configured to obtain a photothermal image by scanning multiple points rather than a single point on the wafer surface. The optical measurement apparatus 10 may include a light source 100 configured to generate the first light 20 and the second light 30, an illumination optical system 1 configured to emit the first light 20 and the second light 30 on a same location on the wafer W surface, and a light receiving optical system 2 configured to collect reflected lights of the first light 20 and the second light 30 from the wafer W surface. The illumination optical system 1 may include a set of components 112, 114, 116, 118, 120 (e.g., optics that couple the first light and the second light from the light source to the sample). The light receiving optical system 2 may include a set of components 130, 140 (e.g., optics that couple the reflected lights of the first light and the second light from the sample to detectors). The physical property detector 200 may include a light detector 220 configured to detect the reflected light 32 of the second light 30 collected by the light receiving optical system 2. The at least one structure detector 300 may include a light detector configured to detect at least one reflected light 22 or 32 among the first light 20 and the second light 30 collected by the light receiving optical system 2.

The wafer W may be a semiconductor substrate. For example, the semiconductor substrate may be silicon, strained silicon (strained Si), silicon alloy, silicon carbide (SiC), silicon germanium (SiGe), silicon germanium carbide (SiGeC), germanium, germanium alloy, gallium arsenide (GaAs), indium arsenide (InAs) and III-V semiconductors, II-VI semiconductors and a combination thereof. Additionally, if necessary, the wafer may be an organic plastic substrate rather than the semiconductor substrate.

The wafer W may be supported on the stage 50. The stage 50 may move the wafer W to a specific position during a measurement process. For example, the optical measurement apparatus 10 may include a stage driver such as a stage scanner. The stage scanner may move the stage 50 in a first direction or a second direction perpendicular to the first direction to scan the first light 20 and the second light 30 on the wafer W. Alternatively, the optical measurement apparatus 10 may include a mirror scanner for scanning the wafer W. The mirror scanner may rotate an optical mirror by a predetermined angle to scan the first light 20 and the second light 30 on the wafer W.

In some example embodiments, the first light emitter 102 may include a first light source that generates the first light 20. The first light 20 may have a first wavelength of an infrared wavelength band. The first light 20 may have a wavelength of a mid-infrared (Mid-IR) band. The first light source may include a wavelength tunable laser. The tunable laser may select and output light having a specific wavelength within the infrared wavelength band. The first light 20 may include continuous light or pulsed light. When the first light 20 is continuous light, the first light emitter 102 may output light modulated at a specific frequency by a modulator. The first light emitter 102 may include a tunable mid-IR pulsed laser. For example, the first light emitter 102 may include a quantum cascade laser (QCL), an optical parametric oscillator (OPO), etc. The first light emitter 102 may vary the wavelength of the first light 20 to find a wavelength absorbed by a material to be analyzed. The first light 20, which may be pulse light of a specific frequency, may be a pump beam that is emitted on the surface of the wafer W and causes periodic local heating of the material to generate a thermal wave in the material.

The second light emitter 104 may include a second light source that generates the second light 30. The second light 30 may have a second wavelength of a visible light or ultraviolet ray wavelength band. The second light source may be a broadband light source such as a visible light or ultraviolet laser. The second light emitter 102 may extract and output light of a specific wavelength of broadband light. Alternatively, the second light source may be a narrow band light source with a specific wavelength. The second light 30 may be a probe beam that is used to detect optical properties of the wafer W. The second light 30 may detect the response of the wafer W to the incidence of the first light 20, which is infrared light. The wavelength of the second light 30 may be fixed to one specific wavelength for spatial resolution.

As illustrated in FIG. 1, the first light 20 as a pump beam emitted from the first light emitter 102 and the second light 30 as a probe beam emitted from the second light emitter 104 may share an illumination optical system 1 and may be incident on the wafer W surface through the illumination optical system 1. The illumination optical system 1 may include an inclined optical system that causes the first light 20 and the second light 30 to be obliquely incident on the wafer W surface (i.e., the illumination optical system 1 may be configured to direct light to be obliquely incident).

In particular, the first light 20 emitted from the first light emitter 102 may be reflected by a mirror 112, may pass through a dichroic mirror 114, and then, may be reflected by reflective mirrors 116 and 118 to be directed to the wafer W. The directed first light 20 may be focused onto a region of interest on the surface of the wafer W by an objective lens 120. The second light 30 emitted from the second light emitter 104 may be reflected by the dichroic mirror 144 as a beam combiner and may move along the optical path of the first light 20. Accordingly, the first light 20 and the second light 30 may be incident obliquely at a predetermined angle with respect to the surface of the wafer W.

The physical property detector 200 may include a light detector 220 configured to detect the reflected light 32 of the second light 30 from the surface of the wafer W. The reflected light 32 reflected (or scattered) from the surface of the wafer W may be collected by the light detector 220. The light receiving optical system 2 may include an inclined optical system that collects the reflected light 32 obliquely reflected from the surface of the wafer W (i.e., the illumination optical system 1 may be configured to direct light to be obliquely incident).

The reflected light 32 reflected (or scattered) from the surface of the wafer W may be collected by a collection lens 130 of the light receiving optical system 2, and the collected reflected light 32 may be reflected by a dichroic mirror 140 and then may be moved to the light detector 220 via a lens 210. For example, the light detector 220 may include a photodiode or a camera as a two-dimensional image sensor. The light detector 220 may detect a light intensity of the probe beam of the visible light band. When the first light emitter 102 includes a pump laser in the infrared region and the second light emitter 104 includes a probe laser in the visible region, a spatial resolution of 1 μm or less may be provided depending on the diffraction limit of the wavelength of the used probe beam. Additionally, the light detector 220 may have relatively high sensitivity because it uses a general photodiode rather than an infrared detector (the infrared detecting being expensive in cost and maintenance and having low sensitivity).

The light detector 220 may further include a filter such as a lock-in amplifier. The light detector 220 may be synchronized with the pulse light emitted from the first light emitter 102 by the lock-in amplifier. The light detector 220 may detect the reflected light 32 of the second light 30 in the frequency pulse section of the first light 20.

A detection signal detected by the light detector 220 may be input to the processor 60, and the processor 60 may obtain an absorption spectrum in a certain area including pixels corresponding to the region of interest on the surface of the wafer W based on the detection signal.

For example, when the first light 20, which may be infrared pulse light with a specific wavelength (λ1), is emitted to the region of interest on the surface of the wafer W, molecules on the surface of the wafer W may absorb the infrared light of the specific wavelength and may become excited, generating heat and causing changes in refractive index (n), extinction coefficient (k), etc. These changes may result in a path difference of the second light 30 of the visible light region emitted to the region of interest, and the light detector 220 may measure the path difference of the probe beam to check the degree of infrared absorption. The absorption spectrum depending on the wavelength may be obtained by measuring a change in signal value of the reflected light 32 of the second light 30 while changing the wavelength in the infrared wavelength band of the first light 20. By changing the wavelength of the first light 20, molecular components excited at a specific wavelength within the mid-infrared range may be identified.

The first light 20 and the second light 30 of a specific wavelength may be emitted to multiple points on the surface of the wafer W by scanning on the wafer W, and the light detector 220 may obtain a two-dimensional photothermal image. The two-dimensional photothermal image may provide a structural image in space. Using a confocal microscope scanning system, a spatial resolution of 1 μm or less may be provided and at the same time, a sensitivity similar to that of Fourier transform infrared technology may be obtained. Accordingly, the physical property detector 200 may detect chemical defects in a microscopic area of the patterned wafer.

Figure 2:
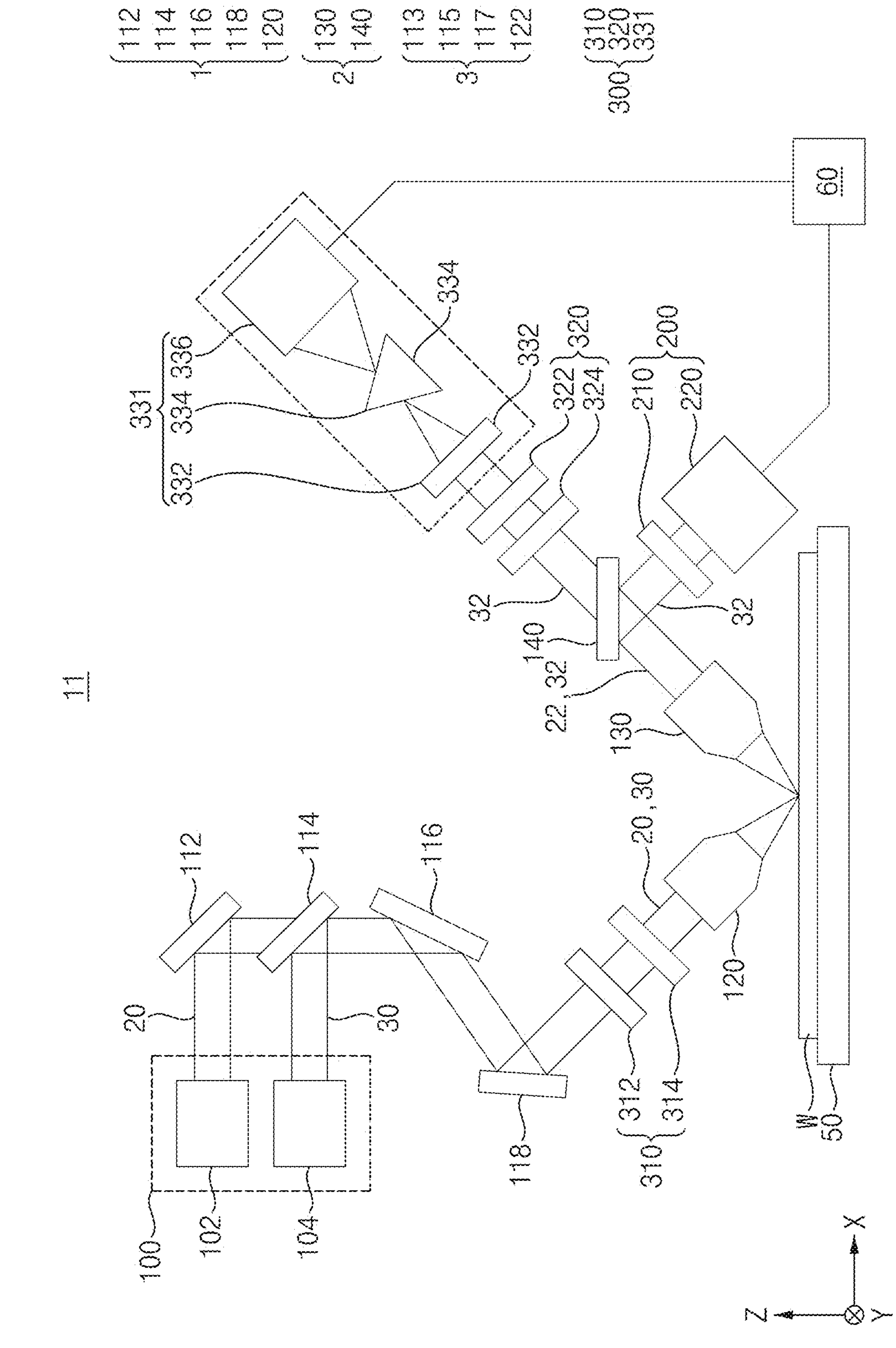
FIG. 2 is a block diagram illustrating an optical measurement apparatus according to one or more example embodiments.
Figure 3:
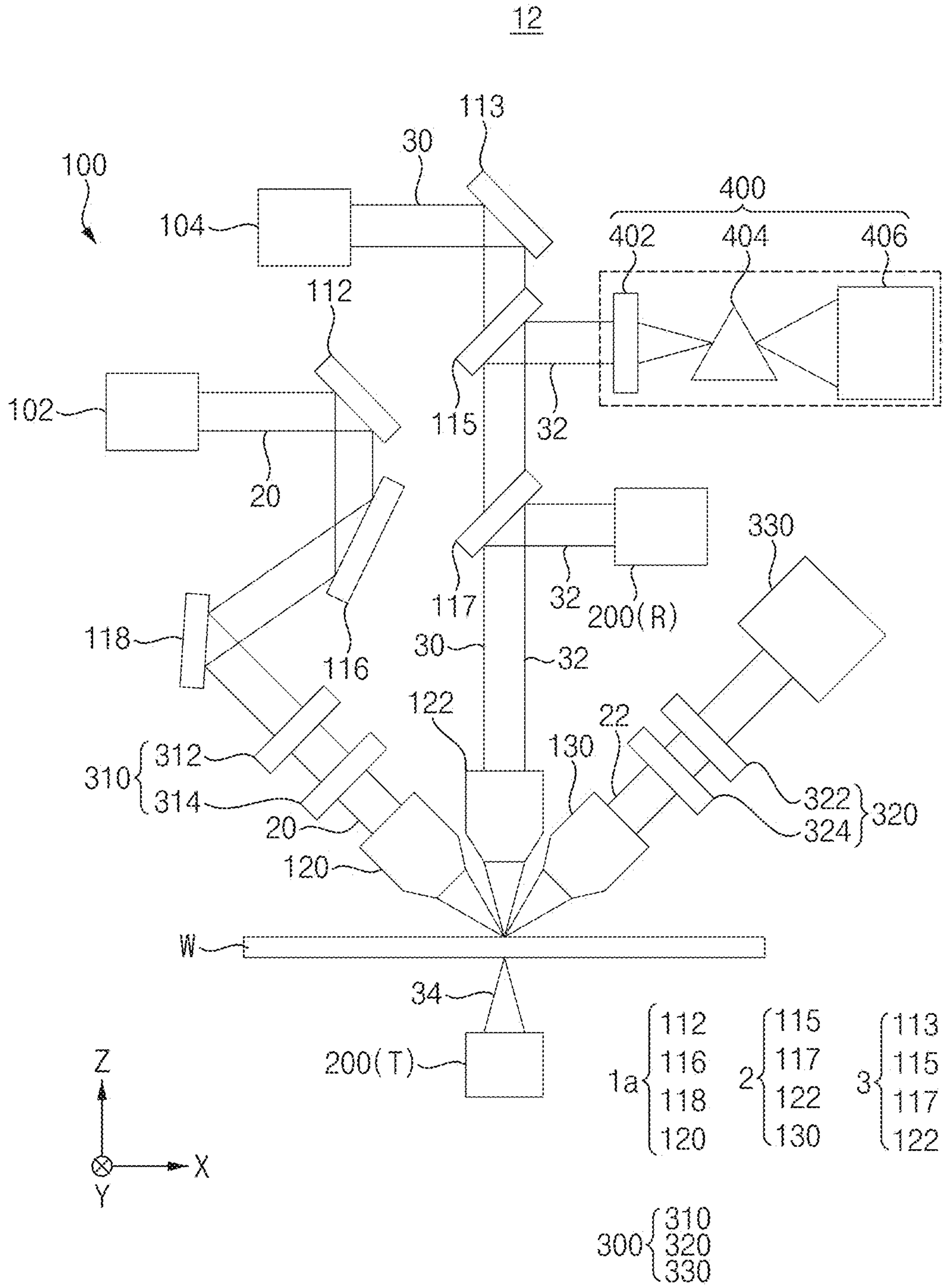
FIG. 3 is a block diagram illustrating an optical measurement apparatus according to one or more example embodiments.
Figure 4:
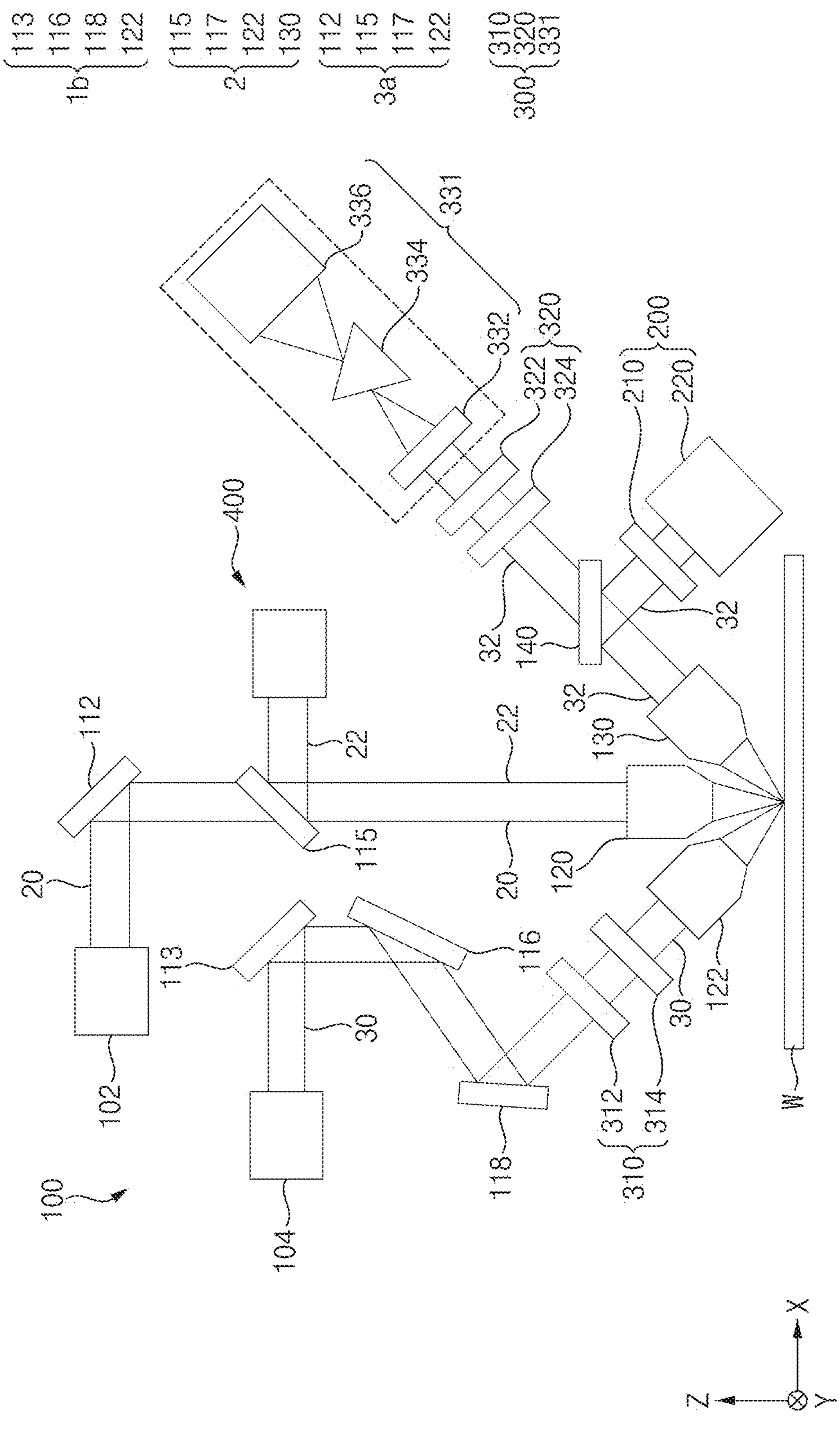
FIG. 4 is a block diagram illustrating an optical measurement apparatus according to one or more example embodiments.

The at least one structure detector may include an ellipsometer 300 (e.g., FIGS. 1-4). The at least one structure detector may include an ellipsometer 300 and a spectroscopic reflectometer 400 (FIGS. 3-4). The at least one structure detector may include a spectral interferometer 500 (e.g., FIGS. 5-6). It will be understood by one of ordinary skill in the art that the at least one structure detector may include any or all of the ellipsometer 300, the spectroscopic reflectometer 400 and the spectral interferometer 500.

In some example embodiments, the at least one structure detector may include an ellipsometer 300 configured to measure a change in a polarization state of the at least one light. The ellipsometer 300 may measure changes in polarization characteristics of the first light 20 as the pump beam to obtain structural information of the pattern on the surface of the wafer W. The ellipsometer 300 may include a polarization state generator 310 disposed on the path of the first light 20 that is to be incident at an angle with respect to the surface of the wafer W, a polarization state analyzer 320 disposed on the path of the reflected light 22, and a light detector 330 configured to detect the reflected light 22 that has passed through the polarization state analyzer 320.

In particular, the polarization state generator 310 may include a polarizer 312 and a compensator 314 disposed in the illumination optical system 1. The first light 20 may pass through the polarizer 312 and the compensator 314 and may be emitted to the measurement area of the wafer W placed on the stage 50.

The polarizer 312 may adjust a polarization direction of the incident light (that is, the first light 20). The polarizer 312 may include a rotating portion that adjusts the polarization direction and rotates at a first angle. The first angle of the polarizer 312 may be maintained to have a constant value. Alternatively, the polarizer 312 may be electrically connected to the controller, and the controller may adjust the first angle of the polarizer 312.

The compensator 314 may adjust a phase difference of the first light 20. The compensator 314 may include a rotating portion and may rotate at a second angle. The compensator 314 may adjust the phase difference of the first light 20 using the rotating portion. The compensator 314 may be electrically connected to the controller. The controller may adjust the second angle of the compensator 314.

Accordingly, the first light 20 having a specific wavelength generated from the first light emitter 102 may be emitted to the measurement area on the wafer W through the polarization state generator 310.

The polarization state analyzer 320 may include an analyzer 322 that is disposed in the light receiving optical system 2. The polarization state analyzer 320 may further include a compensator 324. The reflected light 22 of the first light 20 reflected from the wafer W may be collected by the collection lens 130 of the light receiving optical system 2, and the collected reflected light 22 may pass through the dichroic mirror 140, and then, may be moved to the light detector 330 through the polarization state analyzer 320.

The analyzer 322 may adjust a polarization direction of the reflected light 22 reflected from the wafer W. The analyzer 322 may include a rotating portion and may rotate at a third angle. The analyzer 322 may be electrically connected to the controller. The controller may adjust the third angle of analyzer 322. The analyzer 322 may transmit only a linearly polarized component corresponding to the third angle.

For example, the light detector 330 may include a photodiode or a camera as a two-dimensional image sensor. The ellipsometer 300 may be a single wavelength ellipsometer (SWE) configured to detect the first light 20 having a specific wavelength in the mid-infrared wavelength band.

Measurement variables measured by the ellipsometer 300 may include a film thickness, critical dimension (CD), a pattern height, a recess, an overlay, or a defect. In the ellipsometer 300, when light with a polarization component passes through the wafer W, a reflectance and a phase value may change depending on the polarization direction (p-wave, s-wave). The ellipsometer 300 may measure electromagnetic field values of the p-wave and s-wave while changing a combination of the angle set of the polarizer angle and the analyzer angle. The first angle of the polarizer 312 may determine the polarization direction of light incident on the wafer W, and the second angle of the compensator 314 may determine the phase difference between the p-wave and the s-wave. The third angle of the analyzer 322 may determine the polarization direction of light incident on the light detector 330 after passing through the wafer W.

As described above, the optical measurement apparatus 10 may include the physical property detector 200 configured to detect the change in the amount of light of the second light 30 due to the photothermal effect of the first light 20 on the wafer W surface to obtain physical property information on the wafer W surface, and the ellipsometer 300 configured to detect the reflected light 22 of the first light 20 to obtain structural information on the surface of the wafer W.

The optical measurement apparatus 10 may simultaneously obtain infrared absorption spectrum and short-wavelength ellipsometry spectrum of the wafer W while changing the wavelength of the pump beam in the mid-infrared region. When mid-infrared light is used for short-wavelength ellipsometry, the wafer W with high aspect ratio structures may be easily measured by increasing the penetration depth. The short-wavelength ellipsometer may have excellent long-term stability because of using light of a single wavelength. Additionally, when combined with photothermal imaging technology, structural information and chemical composition information of the wafer W may be obtained simultaneously.

FIG. 2 is a block diagram illustrating an optical measurement apparatus according to one or more example embodiments. The optical measurement apparatus may be substantially the same as or similar to the optical measurement apparatus described with reference to FIG. 1 except for a configuration of an ellipsometer. Thus, same reference numerals may be used to the same or like elements and any further repetitive explanation concerning the above elements may be omitted.

Referring to FIG. 2, an ellipsometer 300 of the at least one structure detector of an optical measurement apparatus 11 may detect a reflected light 32 of a second light 30 to obtain structural information on a wafer W surface. A light detector 331 of the ellipsometer 300 may include a lens 332, a spectrometer 334, and a detection sensor 336. The spectrometer 334 may include optical elements such as prisms and gratings. The detection sensor 336 may include a detection array that detects an intensity of light depending on a location.

In some example embodiments, a second light 30 may be emitted to a measurement region of the wafer W placed on a stage 50 through a polarization state generator 310, a reflected light 32 of the second light 30 reflected from the wafer W may be collected by a collection lens 130 of a light receiving optical system 2, and the collected reflected light 32 may pass through a dichroic mirror 140 and then through a polarization state analyzer 320 to be moved to the light detector 331. Then, the reflected light 32 may pass through the lens 332 of the light detector 331, may be separated according to wavelength by the spectrometer 334, and then may be detected by the detection sensor 336.

A second light emitter 104 may generate white light as a probe beam. A photothermal signal may be obtained by detecting the second light 30 having a specific wavelength in a visible light wavelength band. The ellipsometer 300 may obtain structural information on the wafer W surface by detecting the reflected light 32 of the second light 30 having the specific wavelength.

FIG. 3 is a block diagram illustrating an optical measurement apparatus according to one or more example embodiments. The optical measurement apparatus may be substantially the same as or similar to the optical measurement apparatus described with reference to FIG. 1 except for a configuration of an optical system and an additional of a spectroscopic reflectometer. Thus, same reference numerals may be used to the same or like elements and any further repetitive explanation concerning the above elements may be omitted.

Referring to FIG. 3, an optical measurement apparatus 12 may include a physical property detector 200 configured to detect a change in an amount of light of a second light 30 due to a photothermal effect of a first light 20 on a surface of the wafer W to obtain physical property information on the wafer surface, and a structure detector having an ellipsometer 300 configured to detect a change in a polarization state of the first light 20 and a spectroscopic reflectometer 400 configured to measure a reflectance by wavelength of the second light 30.

In some example embodiments, the first light 20 emitted from a first light emitter 102 may be directed to an inclined optical system la by a mirror 112 and reflective mirrors 116 and 118. The directed first light 20 may be focused onto a region of interest on the surface of the wafer W by an objective lens 120 of the inclined optical system 1*a* (i.e., the illumination optical system 1*a* may be configured to direct light to be obliquely incident). The illumination optical system la may include a set of components 112, 116, 118, 120 (e.g., optics that couple the first light from the first light emitter to the sample). The second light 30 emitted from a second light emitter 104 may be reflected by a mirror 113 and directed to a vertical optical system 3 (i.e., the optical system may be configured to direct light to be perpendicularly incident). The vertical optical system 3 may include a set of components 113, 115, 117, 122 (e.g., optics that couple the second light from the second light emitter to the sample). The directed second light 30 may be focused onto the region of interest on the surface of the wafer W by an objective lens 122 of the vertical optical system 3. Accordingly, the first light 20 may be incident at a predetermined angle to the surface of the wafer W by the inclined optical system, and the second light 30 may be incident perpendicular to the surface of the wafer W by the vertical optical system 3.

The physical property detector 200 may include a first light detector 220R for detecting a reflected light 32 of the second light 30 from the surface of the wafer W and/or a second light detector 220T for detecting a transmitted light 34 of the second light 30 that has transmitted through the wafer W. The reflected light 32 reflected from the surface of the wafer W may be collected by an objective lens 122, and the collected reflected light 32 may be reflected by a beam splitter 117 and may be directed to the first light detector 220R. The transmitted light 34 passing through the wafer W may be collected by the second light detector 220T through a collection lens. For example, the first and second light detectors 220R and 220T may include a photodiode or a camera as a two-dimensional image sensor. The first and second light detectors 220R and 220T may detect a light intensity of the probe beam in the visible light band.

In some example embodiments, the ellipsometer 300 may include a polarization state generator 310 disposed in a path of the first light 20 that is to be incident at an angle with respect to the surface of the wafer W, a polarization state analyzer 320 disposed on a path of the reflected light 22 of the first light 20 reflected from the surface of the wafer W, and a light detector 330 configured to detect the reflected light 22 that has passed through the polarization state analyzer 320. The ellipsometer 300 may be an SWE for detecting the first light 20 having a specific wavelength in the mid-infrared wavelength band.

In some example embodiments, the spectroscopic reflectometer 400 may measure destructive and constructive interference for each wavelength due to interference between the second light 30 incident on the surface of the wafer W and the reflected light 32 of the second light to determine a thickness. The reflected light 32 reflected from the surface of the wafer W may be collected by the objective lens 122, and the collected reflected light 32 may be reflected by a beam splitter 115 and may be directed to the spectroscopic reflectometer 400. The spectroscopic reflectometer 400 may include a lens 402, a spectrometer 404, and a detection sensor 406.

The spectroscopic reflectometer 400 may have a lower sensitivity than the ellipsometer 300, so it may be difficult to measure thicknesses of 50 nm or less, but it may be used when measuring relatively thick film thicknesses. Accordingly, the ellipsometer 300 and the spectroscopic reflectometer 400 may be mutually compatible. Alternatively, only the spectroscopic reflectometer 400 may be used as the structure detector, and the ellipsometer may be omitted.

FIG. 4 is a block diagram illustrating an optical measurement apparatus according to one or more example embodiments. The optical measuring apparatus may be substantially the same as or similar to the optical measuring apparatus described with reference to FIG. 3 except for optical paths of a first light and a second light and configurations of an ellipsometer and a spectroscopic reflectometer. Thus, same reference numerals may be used to the same or like elements and any further repetitive explanation concerning the above elements may be omitted.

Referring to FIG. 4, an optical measurement apparatus 13 may include a physical property detector 200 configured to detect a change in an amount of light of a second light 30 due to a photothermal effect of a first light 20 on a surface of a wafer W to obtain physical property information on the wafer W surface, and a structure detector having an ellipsometer 300 configured to measure a change in a polarization state of the second light 30 and a spectroscopic reflectometer 400 configured to measure a reflectance by wavelength of the first light 20.

In some example embodiments, the first light 20 emitted from a first light emitter 102 may be reflected by a mirror 112 and may be directed to a vertical optical system 3*a* (i.e., the optical system may be configured to direct light to be perpendicularly incident). The directed first light 20 may be focused onto a region of interest on the surface of the wafer W by an objective lens 120. The second light 30 emitted from a second light emitter 104 may be directed to an inclined optical system 1*b* by a mirror 113 and reflective mirrors 116 and 118 (i.e., the illumination optical system 1*b* may be configured to direct light to be obliquely incident). The illumination optical system 1*b* may include a set of components 113, 116, 118, 122 (e.g., optics that couple the second light from the second light emitter to the sample). The directed second light 30 may be focused onto the region of interest on the surface of the wafer W by an objective lens 122 of the inclined optical system 1*b*. Accordingly, the first light 20 may be incident perpendicularly to the surface of the wafer W by the vertical optical system 3*a*, and the second light 30 may be inclined at a predetermined angle with respect to the surface of the wafer W by the inclined optical system 1*b*. The vertical optical system 3*a* may include a set of components 112, 115, 120 (e.g., optics that couple the first light from the first light emitter to the sample).

The physical property detector 200 may include a light detector 220 for detecting a reflected light 32 of the second light 30 from the surface of the wafer W. The reflected light 32 reflected (or scattered) from the surface of the wafer W may be collected by a collection lens 130 of a light receiving optical system 2, and the collected reflected light 32 may be reflected by a dichroic mirror 140 and may be directed to a light detector 220 through a lens 210. For example, the light detector 220 may include a photodiode or a camera as a two-dimensional image sensor. The light detector 220 may detect a light intensity of the probe beam in a visible light band.

The ellipsometer 300 may include a polarization state generator 310 disposed in a path of the second light 30 that is to be incident at an angle with respect to the surface of the wafer W, polarization state analyzer 320 disposed on a path of the reflected light 32 of the second light 30 reflected from the surface of the wafer W, and a light detector 331 configured to detect the reflected light 32 that has passed through the polarization state analyzer 320. The ellipsometer 300 may obtain structural information on the wafer surface by detecting the reflected light 32 of the second light 30 having a specific wavelength.

The spectroscopic reflectometer 400 may measure destructive and constructive interference for each wavelength due to interference between the first light 20 incident on the surface of the wafer W and the reflected light 22 of the first light to determine a thickness. The reflected light 22 reflected from the surface of the wafer W may be collected by an objective lens 120, and the collected reflected light 22 may be reflected by a beam splitter 115 and directed to the spectroscopic reflectometer 400.

The first light 20 may be incident perpendicularly on the surface of the wafer W by the vertical optical system 3*a* (i.e., the optical system may be configured to direct light to be perpendicularly incident) and may serve as a pump beam for photothermal spectroscopy, and at the same time may be used to measure thickness by the spectroscopic reflectometer 400. The second light 30 may be obliquely incident on the surface of the wafer W by the inclined optical system and may serve as a probe beam for photothermal spectroscopy, and at the same time may be used for structural analysis by the ellipsometer 300.

Figure 5:
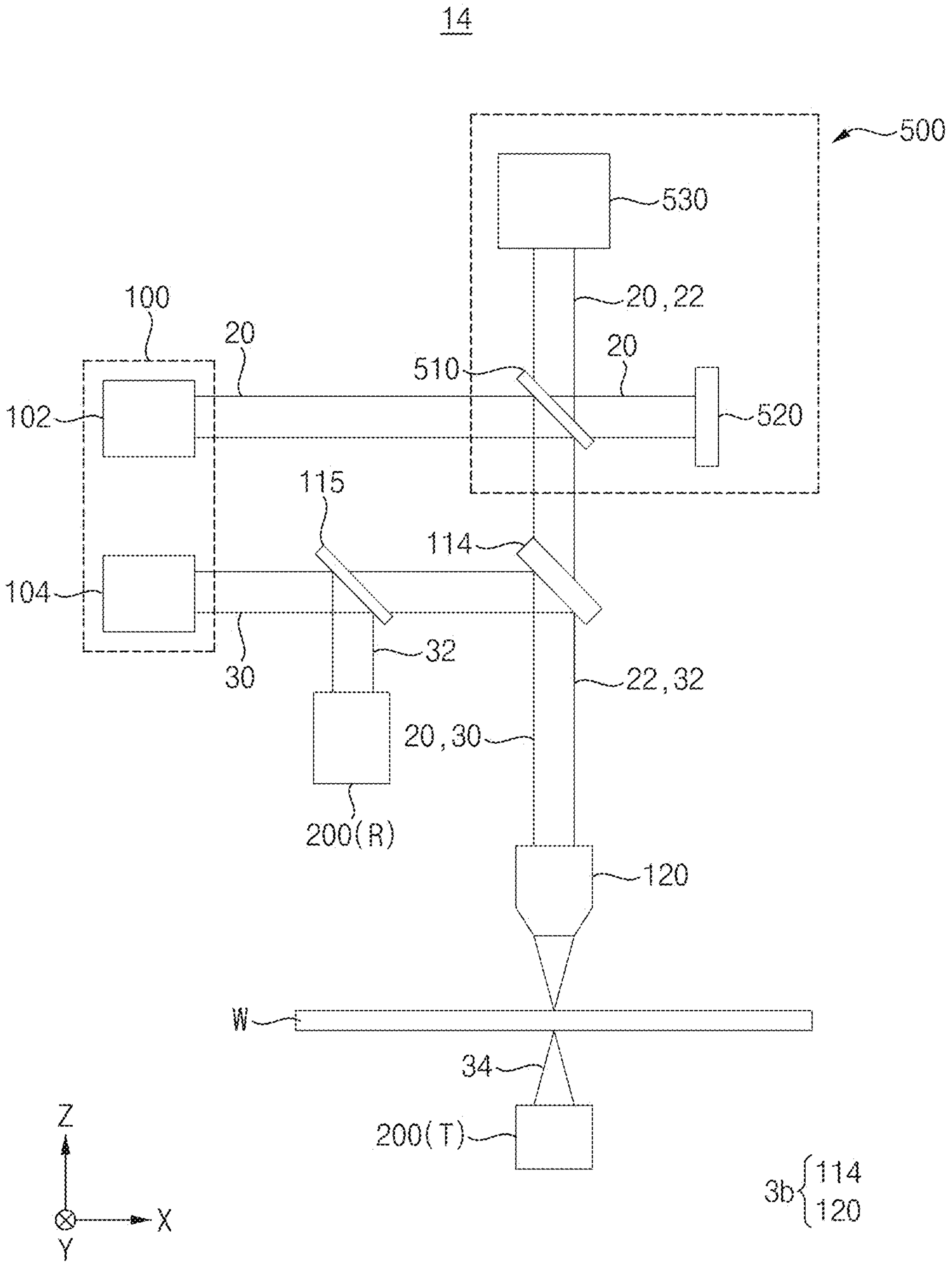
FIG. 5 is a block diagram illustrating an optical measurement apparatus according to one or more example embodiments.

FIG. 5 is a block diagram illustrating an optical measurement apparatus according to one or more example embodiments. The optical measurement apparatus may be substantially the same as or similar to the optical measurement apparatus described with reference to FIG. 1 except for a configuration of an optical system and an additional spectral interferometer. Thus, same reference numerals may be used to the same or like elements and any further repetitive explanation concerning the above elements may be omitted.

Referring to FIG. 5, an optical measurement apparatus 14 may include a physical property detector 200 configured to detect a change in an amount of light of a second light 30 due to a photothermal effect of a first light 20 on a surface of a wafer W to obtain physical property information on the wafer surface, and a structure detector having a spectral interferometer 500 configured to detect an interference signal between the first light 20 and a reflected light 22 of the first light 20 from the surface of the wafer W.

In some example embodiments, the first light 20 emitted from a first light emitter 102 may be reflected by a beam splitter 510 and may be directed to a vertical optical system 3*b*. The vertical optical system 3*b* may include a set of components 114, 120 (e.g., optics that couple the first light from the first light emitter to the sample). The directed first light 20 may be focused onto a region of interest on the surface of the wafer W by an objective lens 120. The second light 30 emitted from a second light emitter 104 may pass through a beam splitter 115, may be reflected by a dichroic mirror 114, and may move along an optical path of the first light 20. Accordingly, the first light 20 and the second light 30 may be incident perpendicularly to the surface of the wafer W.

The physical property detector 200 may include a first light detector 220R for detecting a reflected light 32 of the second light 30 from the surface of the wafer W and/or a second light detector 220T for detecting a transmitted light 34 of the second light 30 that has transmitted through the wafer W. The reflected light 32 reflected from the surface of the wafer W may be collected by the objective lens 120, and the collected reflected light 32 may be firstly reflected by the dichroic mirror 114 and may be secondarily reflected by the beam splitter 115, and may be directed to the first light detector 220R. The transmitted light 34 passing through the wafer W may be collected to the second light detector 220T through a collection lens. For example, the first and second light detectors 220R and 220T may include a photodiode or a camera as a two-dimensional image sensor. The first and second light detectors 220R and 220T may detect a light intensity of the probe beam in a visible light band.

In some example embodiments, the spectral interferometer 500 may include a Michelson interferometer having a beam splitter 510, a reference mirror 520 and a light detector 530. In particular, the spectral interferometer 500 may include the beam splitter 510 to split the first light 20 into two lights that travel on a measurement path toward the surface of the wafer W and a reference path toward the reference mirror 520, respectively. The spectral interferometer 500 may further include the reference mirror 520 to reflect the light travelling along the reference path back to the beam splitter 510, and the light detector 530 for detecting an interference signal between the reflected light 22 of the first light 20 that is incident on the beam splitter 510 after moving along the measurement path and being reflected from the surface of the wafer W and a reflected light reflected from the reference mirror 520 (that is, the first light 20).

The final interference signal measured by the light detector 530 may include a mixture of interference signals between the reflect light 20 reflected from the reference mirror 520 and the reflected light 22 reflected at various positions in the wafer W, and a spectrum signal may be Fourier transformed and a peak signal may be analyzed to obtain structural information such as a depth inside a pattern on the surface of the wafer W.

The first light 20 (e.g., a pump beam) may be incident perpendicularly on the surface of the wafer W and may serve as a pump for photothermal spectroscopy, and at the same time may be used for structural analysis of the spectral interferometer 500. The second light 30 (e.g., a probe beam) may be incident perpendicularly onto the surface of the wafer W and may serve as a probe for photothermal spectroscopy.

Figure 6:
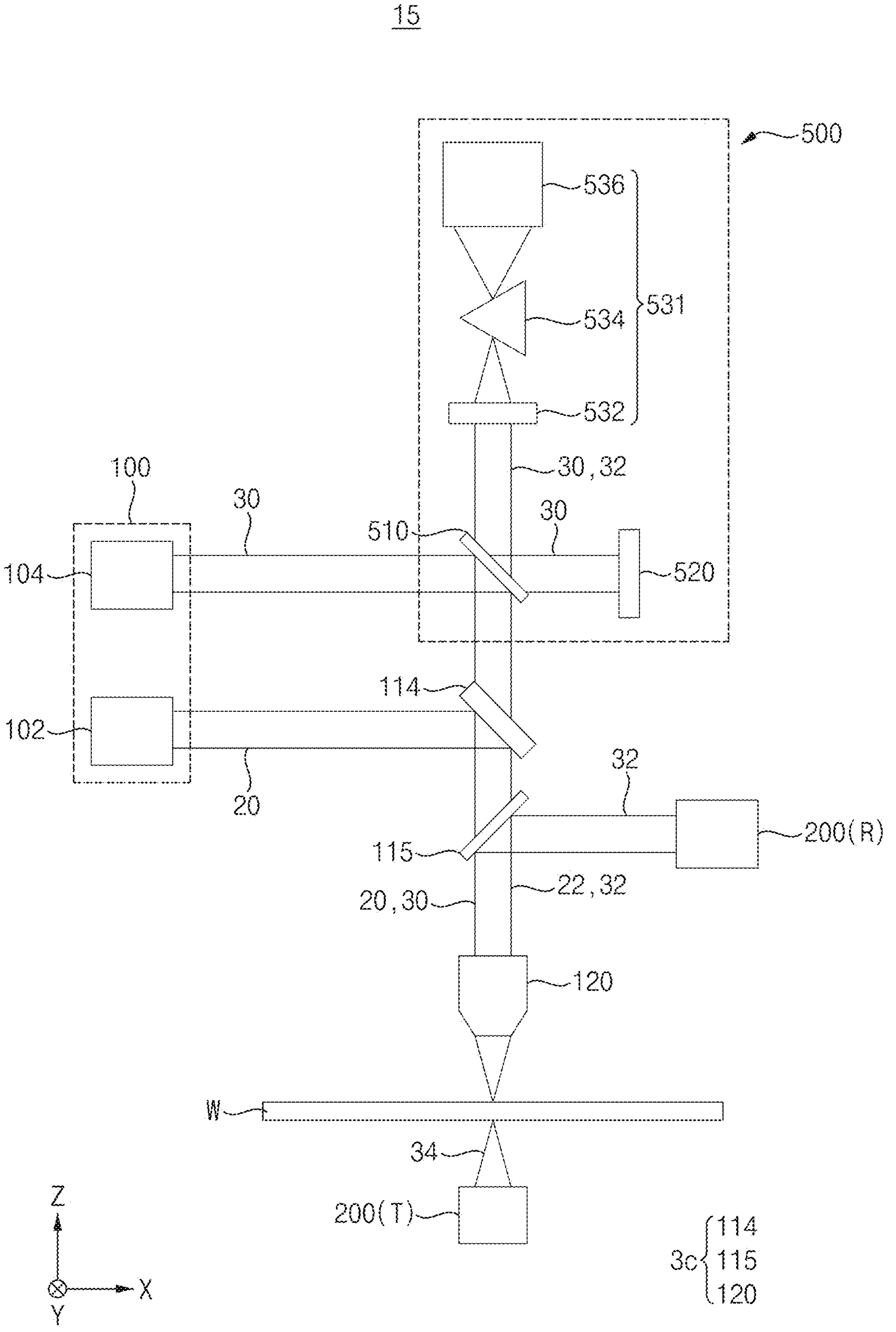
FIG. 6 is a block diagram illustrating an optical measurement apparatus according to one or more example embodiments.

FIG. 6 is a block diagram illustrating an optical measurement apparatus according to one or more example embodiments. The optical measurement apparatus may be substantially the same as or similar to the optical measurement apparatus described with reference to FIG. 5 except for optical paths of a first light and a second light and a configuration of a spectral interferometer. Thus, same reference numerals may be used to the same or like elements and any further repetitive explanation concerning the above elements may be omitted.

Referring to FIG. 6, an optical measurement apparatus 15 may include a physical property detector 200 configured to detect a change in an amount of light of a second light 30 due to a photothermal effect of a first light 20 on a surface of a wafer W to obtain physical property information on the wafer surface, and a structure detector having a spectral interferometer 500 configured to detect an interference signal between the second light 30 and a reflected light 32 of the second light 30 from the surface of the wafer W.

In some example embodiments, the first light 20 emitted from a first light emitter 102 may be reflected by a dichroic mirror 114 and may be directed to a vertical optical system 3*c* (i.e., the optical system may be configured to direct light to be perpendicularly incident). The vertical optical system 3*c* may include a set of components 114, 115, 120 (e.g., optics that couple the first light from the first light emitter to the sample). The directed first light 20 may be focused onto a region of interest on the surface of the wafer W by an objective lens 120. The second light 30 emitted from the second light emitter 104 may be reflected by a beam splitter 510, may pass through the dichroic mirror 114, and move along an optical path of the first light 20. Accordingly, the first light 20 and the second light 30 may be incident perpendicularly to the surface of the wafer W.

The physical property detector 200 may include a first light detector 220R for detecting the reflected light 32 of the second light 30 from the surface of the wafer W and/or a second light detector 220T for detecting a transmitted light 34 of the second light 30 that has transmitted through the wafer W. The reflected light 32 reflected from the surface of the wafer W may be collected by the objective lens 120, and the collected reflected light 32 may be reflected by the beam splitter 115 and may be directed to the first light detector 220R. The transmitted light 34 passing through the wafer W may move to the second light detector 220T through a collection lens. For example, the first and second light detectors 220R and 220T may include a photodiode or a camera as a two-dimensional image sensor. The first and second light detectors 220R and 220T may detect a light intensity of the probe beam in a visible light band.

In some example embodiments, the spectral interferometer 500 may include a Michelson interferometer having a beam splitter 510, a reference mirror 520, and a light detector 531. In particular, the spectral interferometer 500 may include the beam splitter 510 to split the second light 30 into two lights that travel on a measurement path toward the surface of the wafer W and a reference path toward the reference mirror 520 respectively. The spectral interferometer 500 may include the reference mirror 520 to reflect the light traveling along the reference path back to the beam splitter 510, and the light detector 531 for detecting an interference signal between the reflected light 32 of the second light 30 that is incident on the beam splitter 510 after moving along the measurement path and being reflected from the surface of the wafer W and a reflected light reflected from the reference mirror 520, that is, the second light 30. The light detector 531 of the spectral interferometer 500 may include a lens 532, a spectrometer 534 and a detection sensor 536.

The first light 20 may be incident perpendicularly onto the surface of the wafer W to serve as a pump for photothermal spectroscopy. The second light 30 may be incident perpendicularly onto the surface of the wafer W to serve as a probe for photothermal spectroscopy and at the same time may be used for structural analysis by the spectral interferometer 500.

Hereinafter, an optical measurement method using the optical measurement apparatus will be described.

Figure 7:
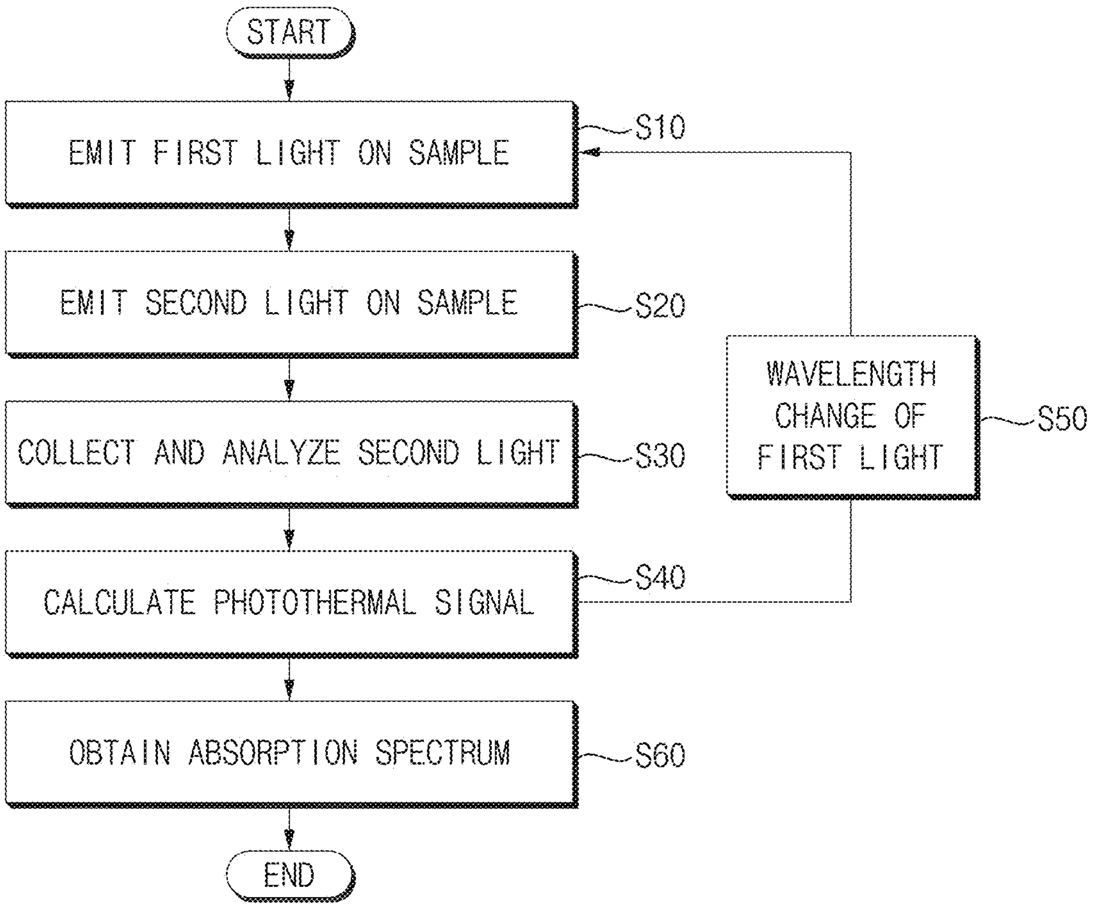
FIG. 7 is a flowchart illustrating a method of analyzing physical properties using photothermal spectroscopy in an optical measurement method according to one or more example embodiments.

FIG. 7 is a flowchart illustrating a method of analyzing physical properties using photothermal spectroscopy in an optical measurement method according to one or more example embodiments.

Referring to FIGS. 1 to 7, first light 20 may be emitted on a sample (such as a wafer W) in operation S10, and then, second light 30 may be emitted on the sample in operation S20. The first light 20 may include a pump beam, and the second light 30 may include a probe beam.

In some example embodiments, after placing the wafer W on a stage 50, the first light 20, which is pulse light of a specific frequency, may be emitted onto a detection area on a surface of the wafer W, and the second light 30 may be emitted onto the detection area on the surface of the wafer W where the first light 20 is emitted. For example, the first light 20 may have a first wavelength in an infrared wavelength band, and the second light 30 may have a second wavelength in a visible light or ultraviolet light wavelength band.

The first light 20, which may be the pulse light of a specific frequency, may be a pump beam that causes periodic local heating of a material on the surface of the wafer W and generates a thermal wave in the material. The second light 30 may be a probe beam that is able to detect a response of the material to the incidence of the first light 20, which may be infrared light. The wavelength of the second light 30 may be fixed to one specific wavelength for spatial resolution.

A reflected light 32 of the second light 30 (which may be a probe beam), may be collected and analyzed in operation S30, and a photothermal signal may be detected in operation S40.

In some example embodiments, the reflected light 32 reflected (or scattered) from the surface of the wafer W may be collected by a collection lens 130, and the collected reflected light 32 may be detected by a light detector 220 of a physical property detector 200. For example, the light detector 220 may include a photodiode or a camera as a two-dimensional image sensor. The light detector 220 may further include a filter such as a lock-in amplifier. The light detector 220 may be synchronized with the pulse light emitted from the first light emitter 102 by the lock-in amplifier.

The detection signal detected by the light detector 220 may be input to a processor 60, and the processor 60 may calculate the photothermal signal based on the detection signal. For example, when the first light 20, which may be infrared pulse light with a specific wavelength (λ1), is emitted to the detection area on the surface of the wafer W, the molecules on the surface of the wafer W may absorb the infrared light of the specific wavelength and may become excited, generating heat and causing changes in refractive index (n), extinction coefficient (k), etc. These changes may result in a path difference of the second light 30 of the visible light region emitted to the region of interest, and the light detector 220 may measure the path difference of the probe beam to confirm the degree of infrared absorption.

In operation S50, the wavelength of the first light 20, which may be the pump beam, may be changed, and operations S10 to S40 may be repeatedly performed to obtain an absorption spectrum according to the wavelength in operation S60.

While changing the wavelength λ1 in the infrared wavelength band of the first light 20, a change in signal value of the reflected light 32 of the second light 30 may be measured to obtain an absorption spectrum according to the wavelength. By changing the wavelength of the first light 20, molecular components excited at a specific wavelength within the mid-infrared range may be identified.

Figure 8:
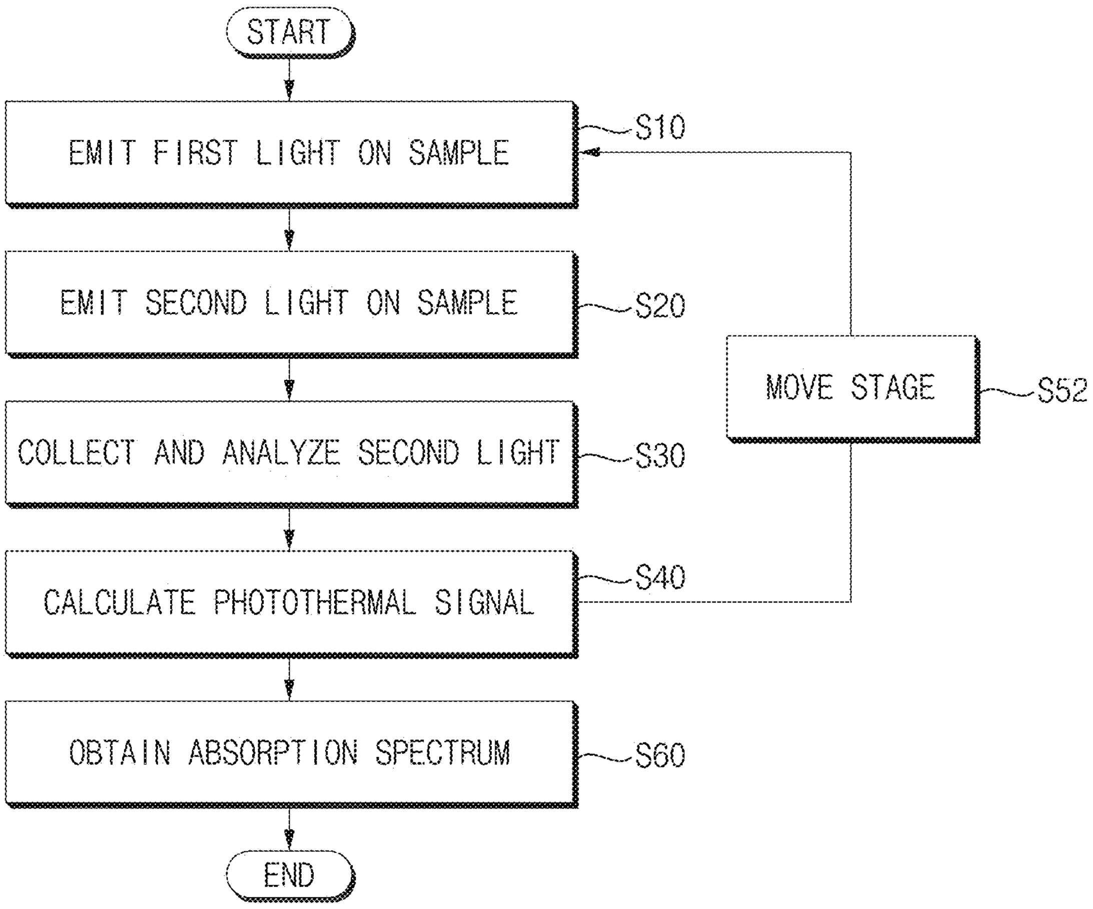
FIG. 8 is a flowchart illustrating a method of analyzing physical properties using photothermal imaging in an optical measurement method according to one or more example embodiments.

FIG. 8 is a flowchart illustrating a method of analyzing physical properties using photothermal imaging in an optical measurement method according to one or more example embodiments.

Referring to FIG. 8, processes the same as or similar to the processes described with reference to operations S10 to S40 of FIG. 7 may be performed to detect a light intensity of a second light 30 (e.g., a probe beam) by a photothermal effect of a first light 20 (e.g., a pump beam) having a specific wavelength (λ1).

The stage 50 may be moved to scan the first light 20 and the second light 30 on the wafer W in operation S52, and operations S10 to S40 may be repeatedly performed to obtain a photothermal image in operation S60.

For example, the stage 50 may be moved by a stage scanner in a first direction or a second direction perpendicular to the first direction to scan the wafer W with the first light 20 and the second light 30. Alternatively, the optical measurement apparatus 10 may include a mirror scanner for scanning the wafer W. The mirror scanner may scan the first light 20 and the second light 30 on the wafer W by rotating the optical mirror by a predetermined angle.

The first light 20 and the second light 30 having a specific wavelength λ1 may be emitted to multiple points on the surface of the wafer W by scanning the wafer W, and the light detector 220 may obtain a two-dimensional photothermal image. The two-dimensional photothermal image may provide a structural image in space. Using a confocal microscope scanning system, a spatial resolution of 1 μm or less may be provided and at the same time a sensitivity similar to that of Fourier transform infrared technology may be obtained. Accordingly, the physical property detector 200 may detect chemical defects in a microscopic area of the patterned wafer.

Figure 9:
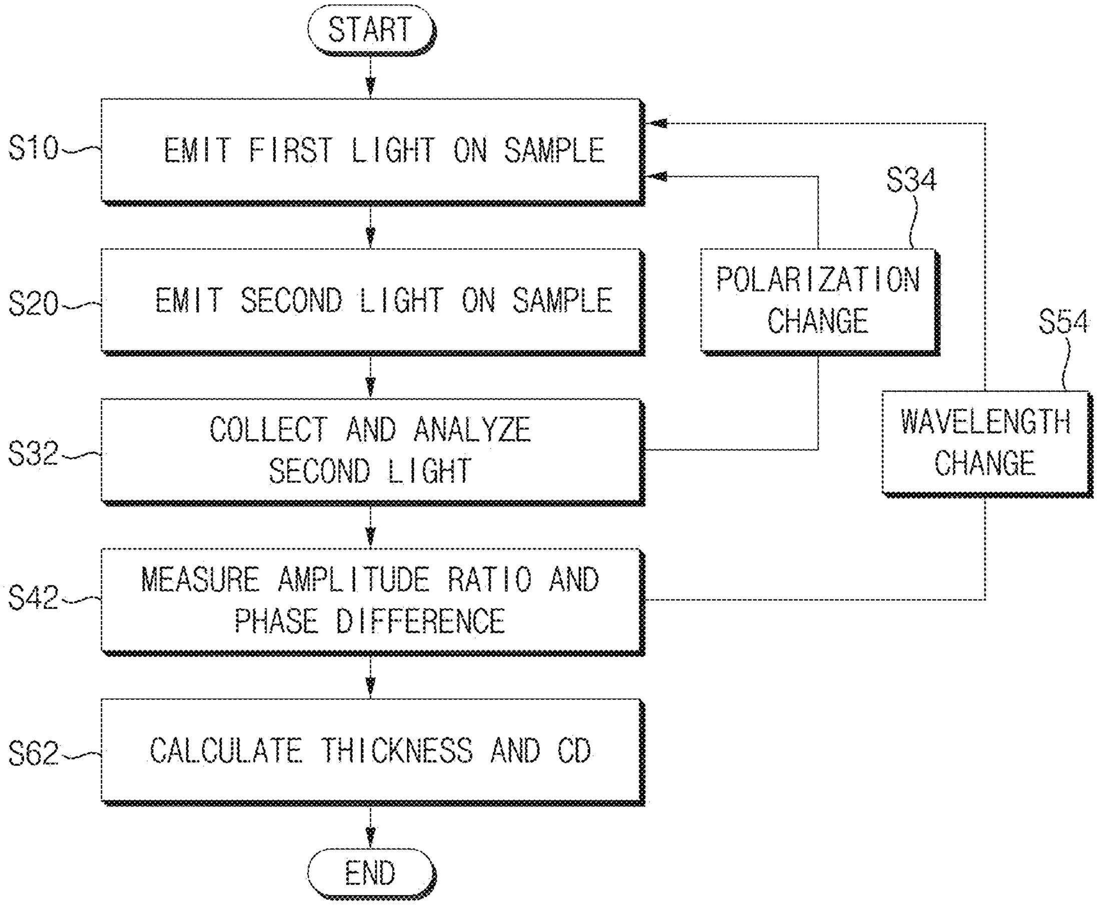
FIG. 9 is a flowchart illustrating a structural analysis method using an ellipsometer in an optical measurement method according to one or more example embodiments.

FIG. 9 is a flowchart illustrating a structural analysis method using an ellipsometer in an optical measurement method according to one or more example embodiments.

Referring to FIGS. 1, 3 and 9, processes the same as or similar to the processes described with reference to operations S10 and S20 of FIG. 7 may be performed to emit a first light 20 (e.g., a pump beam) and a second light 30 (e.g., a probe beam) onto a sample such as a wafer W (operations S10, S20), and a reflected light 22 of the first light 20 (e.g., a pump beam,) may be collected and analyzed in operation S32.

In some example embodiments, the first light 20 emitted from the first light emitter 102 may be emitted to a measurement area of the wafer W through a polarization state generator 310, a reflected light 22 of the first light 20 reflected from the wafer W may be collected by a collection lens 130, and the collected reflected light 32 may pass through a polarization state analyzer 320 and then be directed to a light detector 330. The light detector 330 may include a photodiode or a camera as a two-dimensional image sensor.

In operation S34, the polarization state of the first light 20 may be changed. Operations S10 to S32 may be repeatedly performed to detect the reflected light 32 of the first light 20 having a specific wavelength λ1 and an amplitude ratio and a phase difference may be measured in operation S42.

When the first light 20 having a polarization component passes through the wafer W, a reflectance and a phase value may change depending on the polarization direction (p-wave, s-wave). The structure detector (e.g., an ellipsometer 300) may measure electromagnetic field values of the p-wave and the s-wave while changing a combination of the angle set of the polarizer angle and the analyzer angle. The first angle of the polarizer 312 may determine the polarization direction of light incident on the sample, and the second angle of the compensator 314 may determine the phase difference between the p-wave and the s-wave. The third angle of the analyzer 322 may determine the polarization direction of light incident on the light detector 330 after passing through the sample.

The wavelength of the first light 20, which may a pump beam may be changed in operation S54. Operations S10, S20, S32 and S42 may be repeatedly performed to calculate a thickness and critical dimension (CD) of a pattern on the surface of the wafer W in operation S62.

Measurement variables measured by the structure detector 300 (e.g., an ellipsometer 300) may include CD, a pattern height, a recess, an overlay, or a defect. For example, the processor 60 may include a data analyzer or an optical CD (OCD) instrument that includes a spectrum recognition algorithm.

As illustrated in FIG. 9, the ellipsometer may obtain structural information of the sample by measuring the change in the polarization state of the first light 20, which is the pump beam. Alternatively, as illustrated in FIGS. 2 and 4, the ellipsometer may obtain structural information of the sample by measuring the change in the polarization state of the second light 30, which is the probe beam.

Figure 10:
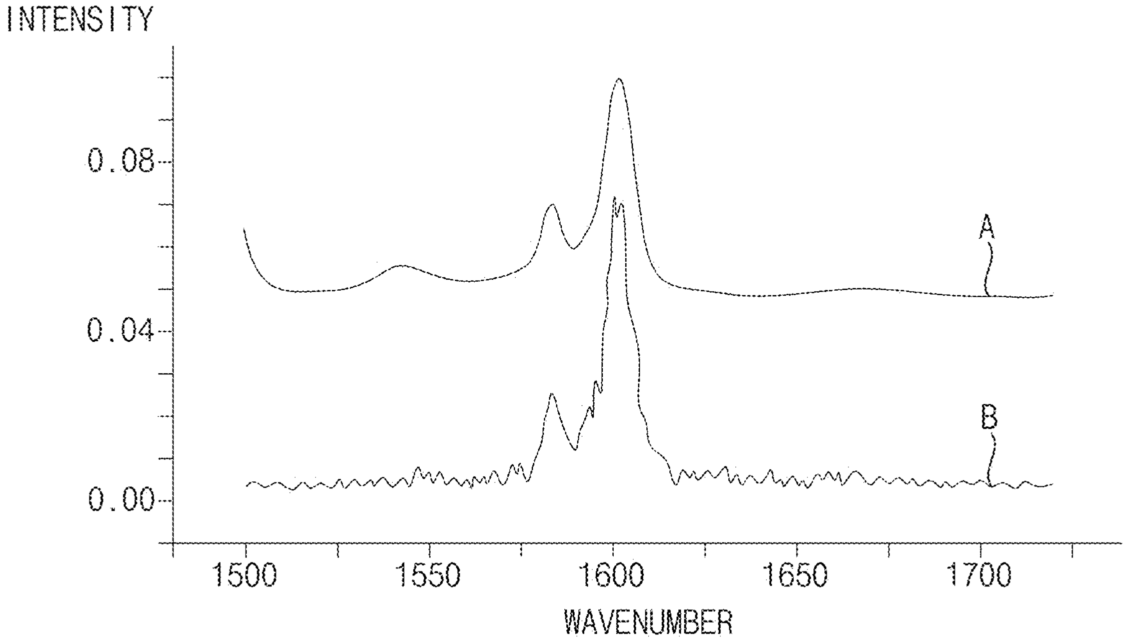
FIG. 10 is a graph illustrating absorption spectrum according to wavelength obtained by a physical property analysis method according to one or more example embodiments and FT-IR spectrum according to wavelength obtained by FT-IR spectroscopy.
Figure 11:
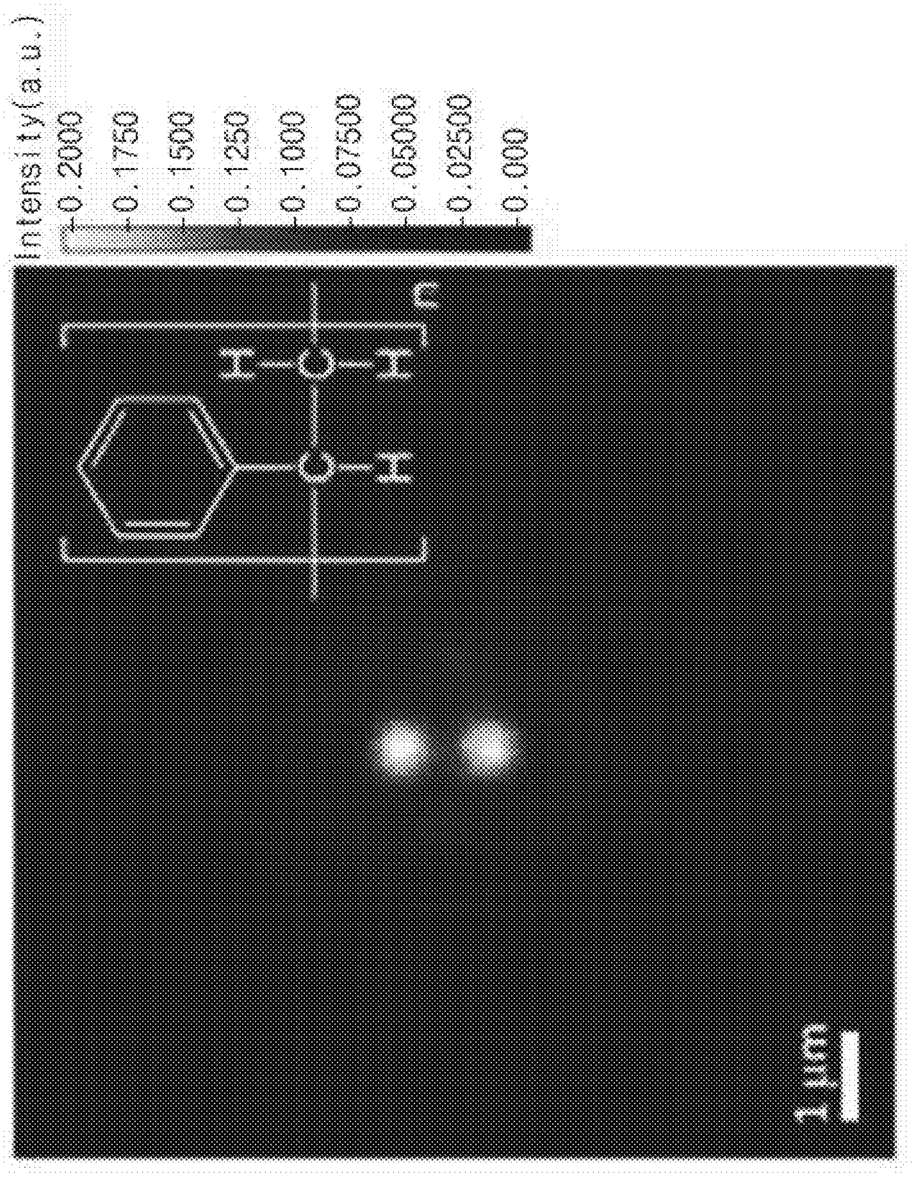
FIG. 11 is a diagram showing a photothermal image obtained by a physical property analysis method according to one or more example embodiments.

FIG. 10 is a graph illustrating absorption spectrum according to wavelength obtained by a physical property analysis method according to one or more example embodiments and FT-IR spectrum according to wavelength obtained by FT-IR spectroscopy. FIG. 11 is a diagram showing a photothermal image obtained by a physical property analysis method according to one or more example embodiments. The graphs of FIG. 10 and the photothermal image of FIG. 11 were obtained from photothermal signals by placing a sample containing polystyrene beads on the stage 50 of FIG. 5 and detecting using the second light detector 220T.

Referring to FIG. 10, a spectrum according to wavelength (photothermal (PT) spectrum, graph B) may be obtained from photothermal signals detected by the second light detector 220T for a sample containing polystyrene beads. A spectrum according to wavelength (FT-IR spectrum, graph A) may be obtained by FT-IR spectroscopy. It may be seen that the PT spectrum may be identical to or similar to the FT-IR spectrum result. It may be seen that the wave number of the infrared pulse pump beam that excites the aromatic C═C stretching of the polystyrene beads is 1600 $cm^{-1}$. At this time, the wavelength of the probe beam is 633 nm, and spatial resolution of sub-μm may be provided depending on the diffraction limit of the probe beam.

Referring to FIG. 11, with the wave number of the pump beam fixed to a specific wave number (1600 $cm^{-1}$), the pump beam and the probe beam may be scanned to irradiate multiple points on the sample surface to obtain a two-dimensional photothermal image. The image of FIG. 11 may be obtained only when using an infrared pump at 1600 $cm^{-1}$, which can be absorbed by the polystyrene beads and generate heat, and when using a wavelength without absorption (e.g., 1700 $cm^{-1}$), it may be seen that an image for the bead does not appear because there is no difference in the path of the beam.

As described above, the first light 20, which may be the pump beam, may be incident on the surface of the wafer W to heat the surface, and the second light 30, which is the probe light, may be incident to the wafer W on which the first light 20 is focused. Physical property information of the wafer W may be obtained by detecting a change in the amount of light of the second light 30 due to the photothermal effect of the first light 20 on the surface of the wafer W. Structural information of the wafer W may be obtained by detecting at least one reflected light among the first light 20 and the second light 30 from the surface of the wafer W.

By measuring the change in signal value of the reflected light 20 of the second light 30 in the visible light region, absorption spectrum according to the wavelength of the first light 20 in the infrared wavelength may be obtained. Therefore, a spatial resolution of 1 μm or less may be provided and at the same time a sensitivity similar to that of Fourier transform infrared technology may be obtained.

Additionally, the thickness or CD of the pattern on the wafer W may be measured by detecting the at least one reflected light among the first light 20 and the second light 30. Accordingly, physical properties and structural measurements may be carried out simultaneously.

The above optical measurement apparatus and the optical measurement method may be used to manufacture a semiconductor package including semiconductor devices such as logic devices or memory devices. The semiconductor package may include logic devices such as central processing units (CPUs), main processing units (MPUs), or application processors (APs), or the like, and volatile memory devices such as dynamic random access memory (RAM) (DRAM)

devices, high bandwidth memory (HBM) devices, or non-volatile memory devices such as flash memory devices, phase-change RAM (PRAM) devices, magnetoresistive RAM (MRAM) devices, resistive RAM (ReRAM) devices, or the like.

According to example embodiments, a change in signal value of a reflected light of a second light in a visible light region may be measured to obtain absorption spectrum according to wavelength of a first light in an infrared wavelength. Therefore, a spatial resolution of 1 μm or less may be provided and at the same time a sensitivity similar to that of Fourier transform infrared technology may be obtained.

Additionally, a thickness or CD of a pattern on a wafer may be measured by detecting a reflected light of at least one light among the first light and the second light. Accordingly, physical properties and structural measurements may be carried out simultaneously.

At least one of the devices, units, components, modules, units, or the like represented by a block or an equivalent indication in the above embodiments including, but not limited to, FIGS. 1-6 may be physically implemented by analog and/or digital circuits including one or more of a logic gate, an integrated circuit, a microprocessor, a micro-controller, a memory circuit, a passive electronic component, an active electronic component, an optical component, and the like, and may also be implemented by or driven by software and/or firmware (configured to perform the functions or operations described herein).

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. An optical measurement apparatus, comprising:

a stage configured to support a sample;

a first light source configured to generate a first light having a first wavelength, the first light comprising pulsed light;

a second light source configured to generate a second light having a second wavelength shorter than the first wavelength;

an illumination optics comprising at least one mirror or lens and configured to emit the first light and the second light on a surface of the sample;

a light receiving optics comprising at least one mirror or lens configured to receive first reflected light of the first light that is reflected from the surface of the sample and second reflected light of the second light that is reflected from the surface of the sample;

a physical property detector configured to obtain physical property information of the sample by detecting a change in an amount of light of the second light due to a photothermal effect of the first light on the surface of the sample; and at least one structure detector configured to obtain structural information of the sample by detecting at least one of the first reflected light and the second reflected light received by the light receiving optics.

2. The optical measurement apparatus of claim 1, wherein the first wavelength is in an infrared wavelength band, and wherein the second wavelength is in a visible light wavelength band or an ultraviolet light wavelength band.

3. The optical measurement apparatus of claim 1, wherein the at least one structure detector comprises an ellipsometer configured to measure a change in a polarization state of the reflected light that is reflected from the surface of the sample.

4. The optical measurement apparatus of claim 1, wherein the at least one structure detector comprises a spectroscopic reflectometer configured to measure a reflectance for each wavelength of at least one of the first light and the second light.

5. The optical measurement apparatus of claim 1, wherein the at least one structure detector comprises a spectral interferometer configured to detect an interference signal between at least one of the first light and the second light and the reflected light that is reflected from the surface of the sample.

6. The optical measurement apparatus of claim 5, wherein the spectral interferometer comprises:

a beam splitter configured to split at least one of the first light and the second light into a first split light that travels on a measurement path toward the surface of the sample and a second split light that travels on a reference path;

a reference mirror configured to reflect the second split light traveling on the reference path back to the beam splitter; and a light detector configured to detect an interference signal between the first split light that is reflected from the surface of the sample and that is incident on the beam splitter and the second split light that is reflected from the reference mirror.

7. The optical measurement apparatus of claim 1, wherein the first light source is further configured to emit the first light of a specific frequency to multiple points on the surface of the sample, and wherein the physical property detector is further configured to obtain a two-dimensional photothermal image of the sample.

8. The optical measurement apparatus of claim 1, wherein the physical property detector is further configured to detect the second reflected light of the second light in synchronization with the pulsed light.

9. The optical measurement apparatus of claim 1, wherein the physical property detector comprises a light detector configured to detect the second reflected light of the second light from the surface of the sample, and wherein the illumination optics is configured to direct the second light to be obliquely incident on the surface of the sample, or is configured to direct the second light to be perpendicularly incident on the surface of the sample.

10. The optical measurement apparatus of claim 1, wherein the physical property detector comprises a light detector configured to detect a transmitted light of the second light that has transmitted through the sample, and wherein the illumination optics is configured to direct the second light to be perpendicularly incident on the surface of the sample.

11. The optical measurement apparatus of claim 1, wherein the at least one structure detector comprises an ellipsometer configured to measure a change in a polarization state of at least one of the first light and the second light, and wherein the illumination optics is configured to direct at least one of the first light and the second light to be obliquely incident on the surface of the sample.

12. The optical measurement apparatus of claim 11, wherein the ellipsometer comprises:

a polarization state generator;

a polarization state analyzer; and a light detector configured to detect reflected light that has passed through the polarization state analyzer.

13. The optical measurement apparatus of claim 1, wherein the at least one structure detector comprises a spectroscopic reflectometer configured to measure a reflectance for each wavelength of at least one of the first light and the second light, and wherein the illumination optics is configured to direct at least one of the first light and the second light to be perpendicularly incident to the surface of the sample.

14. The optical measurement apparatus of claim 1, wherein the at least one structure detector comprises a spectral interferometer configured to detect an interference signal of at least one of the first light and the second light and at least one of the first light and the second light that is reflected from the surface of the sample, and wherein the illumination optics is configured to direct at least one of the first light and the second light to be perpendicularly incident to the surface of the sample.

15. The optical measurement apparatus of claim 14, wherein the spectral interferometer comprises:

a beam splitter configured to split at least one of the first light and the second light into a first split light that travels on a measurement path toward the surface of the sample and a second split light that travels on a reference path;

a reference mirror configured to reflect the second split light traveling on the reference path back to the beam splitter; and a light detector configured to detect an interference signal between the first split light that is reflected from the surface of the sample and that is incident on the beam splitter and the second split light that is reflected from the reference mirror.

16. The optical measurement apparatus of claim 1, wherein the stage is movable along a horizontal direction, and wherein the physical property detector is further configured to obtain a two-dimensional photothermal image of the sample.

* * * * *